(12) United States Patent
Peng

(10) Patent No.: US 6,819,365 B1
(45) Date of Patent: Nov. 16, 2004

(54) COLOR LCD PROJECTOR WITH MICRO DISPLAY LIGHT ENGINE

(75) Inventor: Guolin Peng, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 10/164,837

(22) Filed: Jun. 5, 2002

(51) Int. Cl.[7] .................................. G02F 1/1335
(52) U.S. Cl. ..................... 349/9; 353/31; 353/33
(58) Field of Search ............... 353/70, 31, 33, 353/34; 349/9

(56) References Cited

U.S. PATENT DOCUMENTS

| | | | | |
|---|---|---|---|---|
| 5,541,679 A | * | 7/1996 | Yang | 353/98 |
| 6,183,091 B1 | * | 2/2001 | Johnson et al. | 353/20 |
| 6,247,814 B1 | * | 6/2001 | Lin | 353/20 |
| 6,384,972 B1 | * | 5/2002 | Chuang | 359/495 |
| 6,390,626 B2 | * | 5/2002 | Knox | 353/20 |
| 6,419,362 B1 | * | 7/2002 | Ikeda et al. | 353/20 |
| 6,478,428 B1 | * | 11/2002 | Yi et al. | 353/20 |
| 6,550,919 B1 | * | 4/2003 | Heine | 353/31 |
| 6,626,540 B2 | * | 9/2003 | Ouchi et al. | 353/31 |
| 6,628,346 B1 | * | 9/2003 | Ebiko | 349/9 |
| 6,636,276 B1 | * | 10/2003 | Rosenbluth | 349/8 |
| 6,637,891 B2 | * | 10/2003 | Na | 353/33 |
| 2002/0149747 A1 | * | 10/2002 | Chuang et al. | 353/20 |
| 2002/0196413 A1 | * | 12/2002 | Kwok et al. | 353/20 |

* cited by examiner

*Primary Examiner*—Kenneth Parker
(74) *Attorney, Agent, or Firm*—Nathan D. Jensen; Kyle Eppele

(57) ABSTRACT

A light engine for an LCD projector is disclosed. More particularly, a liquid crystal display projector including a light source emitting a light beam, a light engine, and a projection lens is disclosed. The light engine includes a polarizing beam splitter for receiving the light beam from the light source. The polarizing beam splitter orthogonally reflects a light beam containing multiple colors and passes a first light beam containing a single color. The light engine also includes a dichroic prism that receives the light beam containing multiple colors, reflects a second light beam containing a single color, and passes a third light beam containing a single color. Further, the light engine includes reflective liquid crystal displays associated with each of the first, second, and third light beams containing a single color for receiving, modulating, and reflecting modulated first, second, and third light beams containing a single color for recombination and projection through the projection lens.

15 Claims, 2 Drawing Sheets

COLOR LCD PROJECTOR WITH MICRO DISPLAY LIGHT ENGINE

BACKGROUND OF THE INVENTION

The present invention relates generally to the field of micro-LCD (liquid crystal display) projectors for displaying color images on a screen. More specifically, the present invention relates to a light engine for projecting a LCD display image on a front or rear screen.

Micro Liquid crystal display projectors project a scaled image of an image on a micro-LCD to a screen. Micro-LCD projectors generally include four major components: an illumination source, a light engine, micro liquid-crystal-on-silicon (LCOS) valves, and a projection lens.

In operation, the illumination source provides a high intensity polychromatic or white light through the light engine to the LCOS valves. The LCOS valves incorporate the LCD image into the light and send the light back through the light engine, which directs the light through the projection lens onto a projection screen or surface.

Micro-LCD projectors have the advantage of creating large images for viewing. However, Micro-LCD projectors have traditionally compromised image clarity in favor of image size. Additionally, Micro-LCD projectors have historically been very expensive.

With increased performance, better picture quality, and lower prices, micro-LCD projector use has been increasing in both the consumer market and the business market. Given the expanding use, it is likely that it will be desirable to use a micro-LCD projector in a wide variety of applications. One possible application for a micro LCD projector may be to implement a cockpit display for an airplane.

However, current micro-LCD projectors are required to have a minimum size to house conventional components. The relatively large minimum size is prohibitive for many prospective applications. An airplane cockpit is one example of an application where a compact micro-LCD projector would be desirable.

The light engine is one component, among others, where efficiencies may be gained in both increasing the quality of the image that is projected and reducing the size of the projector. By decreasing the size of the light engine, it is possible to decrease required minimum size of the micro-LCD projector.

Accordingly, there is a need for a compact light engine that facilitates the construction of a compact micro-LCD projector. There is also a need for a compact light engine that can provide the size efficiencies while maintaining, or even increasing, image quality.

SUMMARY OF THE INVENTION

An exemplary embodiment of the invention relates to a micro liquid crystal display projector comprising a light source emitting a light beam, a light engine, and a projection lens. The light engine includes a polarizing beam splitter for receiving the light beam from the light source, wherein the polarizing beam splitter orthogonally reflects a light beam containing multiple colors and passes a first light beam containing a single color, a dichroic prism that receives the light beam containing multiple colors, reflects a second light beam containing a single color, and passes a third light beam containing a single color, and reflective liquid crystal displays associated with each of the first, second, and third light beams containing a single color for receiving, modulating, and reflecting modulated first, second, and third light beams containing a single color for recombination and projection through the projection lens.

Another exemplary embodiment of the invention relates to a micro liquid crystal display projector including a light source emitting an s-polarized multi-colored light beam, a light engine, and a projection lens. The light engine includes a color manipulation filter pair that receives the s-polarized multi-colored light beam and outputs an s-polarized light beam containing two colors distilled from the multi-colored light beam and a p-polarized light beam containing a single color. The light engine also includes a polarizing beam splitter to reflect the s-polarized light beam containing two colors distilled from the multi-colored light beam and to pass the single colored p-polarized light beam. Further, the light engine includes a dichroic prism unit for receiving the s-polarized light beam containing two colors distilled from the multi-colored light beam, the dichroic prism unit including a colored gradient dichroic mirror positioned at a 45 degree angle to the s-polarized light beam containing two colors to separate the s-polarized light beam containing two colors into first and second s-polarized light beams containing a single color. Further still, the light engine includes a cubic glass for receiving and passing the single p-polarized light beam containing a single color. Yet further still, the light engine includes a half wave retarder for receiving the single p-polarized light beam from the cubic glass and converting the single p-polarized light beam into a third s-polarized light beam containing a single color. Yet still further, the light engine includes a first, second and third reflective liquid crystal displays associated with each s-polarized light beam containing a single color for receiving the s-polarized light beam containing a single color, modulating the light beam and reflecting first, second, and third modulated light beams containing a single color respectively for transmission back to the polarizing beam splitter for polarizing selection and recombination, wherein the third modulated light beam containing a signal color passes through the half wave retarder to become a further modulated light beam. Still yet further still, the light engine includes a second color filter pair for receiving a recombined light beam from the polarizing beam splitter containing first and second modulated p-polarized light beams containing a single color and the modulated s-polarized light beam, wherein the second color filter pair convert the modulated s-polarized light beam into a p-polarized state to create a single polarized light beam that is provided as output to the projection lens.

Yet another exemplary embodiment of the invention relates to a method for projecting an LCD image on a screen through a projection lens. The method includes providing a light beam emitted from a light source, passing the light beam through a polarizing beam splitter to produce a first light beam containing a single color and a light beam containing multiple colors, passing the light beam containing multiple colors through a dichroic prism to produce second and third light beams containing a single color, passing the first, second, and third light beams containing a single color to associated first, second, and third reflective liquid crystal displays for modulation and reflection, and recombining the modulated first, second, and third light beams for projection though the projection lens.

BRIEF DESCRIPTION OF THE DRAWINGS

The invention will become more fully understood from the following detailed description, taken in conjunction with the accompanying drawings, wherein like reference numerals refer to like elements, and in which.

DETAILED DESCRIPTION OF THE PREFERRED EMBODIMENTS

Figure 1:
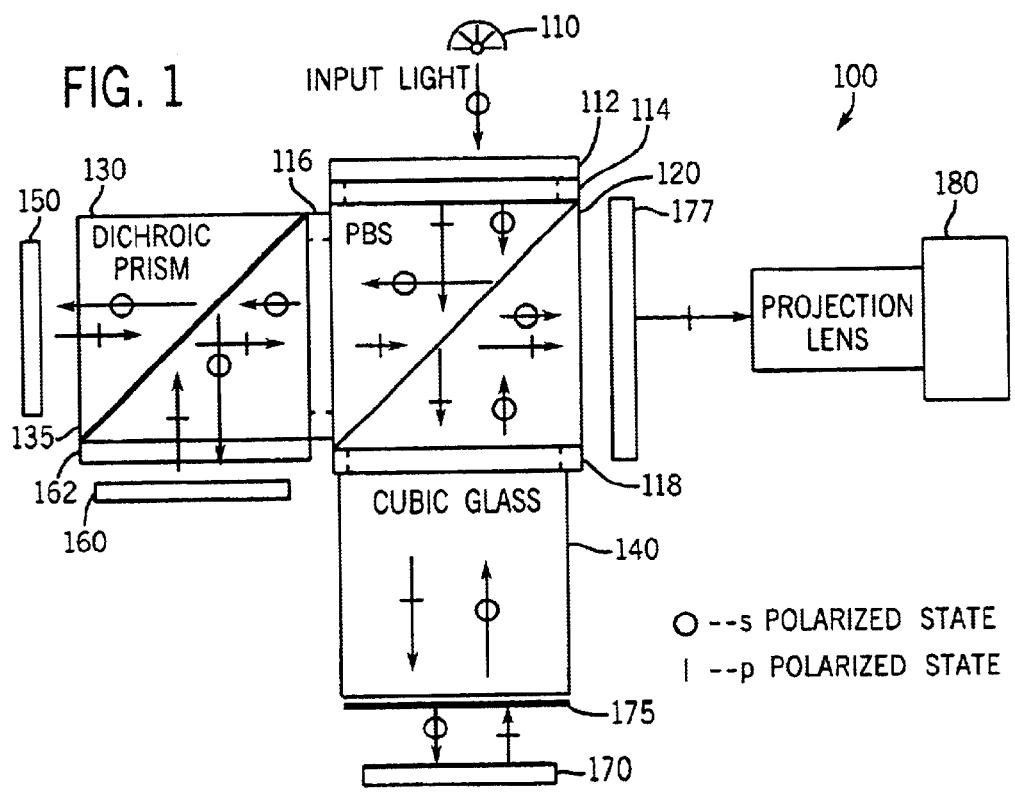
FIG. 1 is an exemplary schematic diagram of a color micro liquid crystal display projection system.

FIG. 1 is an exemplary schematic diagram of a color micro liquid crystal display projection system 100. According to an exemplary embodiment, color micro liquid crystal display projection system 100 includes a light source 110, a polarizing beam splitter 120, a dichroic prism unit 130, a cubic glass 140, a blue LCOS valve 150, a green LCOS valve 160, a red LCOS valve 170 and a projection lens 180.

According to an exemplary embodiment, light source 110 may be, but is not limited to, a high luminance arc lamp, such as a Xenon lamp, a metal-halide lamp, or an ultra-high performance (UHP) lamp. Light source 110 can be of sufficient luminance to project light through filters associated with color liquid crystal display projection system 100, described below, such that sufficient light reaches projection lens 180 to project a viewable image to a projection screen or surface.

According to an exemplary embodiment, polarizing beam splitter 120 can be positioned in front of light source 110 so as to receive input light from light source 110.

Figure 4:
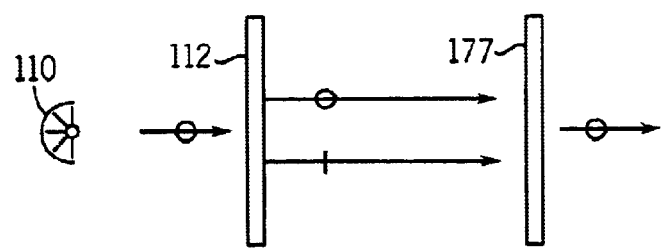
FIG. 4 is an exemplary schematic diagram illustrating the functionality of a color filter pair.

According to an exemplary embodiment, polarizing beam splitter 120 receives light through a red and cyan color filter 112. The operation of red and cyan filter 112 is shown with reference to FIG. 4. When white s-polarized light, emitted by light source 110, passes through red and cyan filter 112, red light is changed into a p-polarizing state, while cyan light remains in a s-polarizing state. Generally, s and p type polarization is a conventional nomenclature referring to orthogonal linear polarization states. Thereafter, the red light and the cyan light can be passed through the second red and cyan filter 177 to restore the single polarized light beam. According to an exemplary embodiment, red and cyan filters 112 and 177 are a ColorSelect™ filter pair provided by ColorLink, Inc. of Boulder, Colo.

According to yet another exemplary embodiment, polarizing beam splitter 120 receives light through a first field aperture 114. First field aperture 114 can be a light blocking barrier that restricts the light passing from light source 110 to polarizing beam splitter 120 to a defined field. First field aperture 114 provides the advantage of defining a single beam that passes through polarizing beam splitter 120 in a defined area. Defining a single beam reduces the amount of light hitting the fringes of polarizing beam splitter 120 and possibly scattering in unintended directions. Further, first field aperture 114 prevents any light from hitting surfaces parallel to the propagation direction to maintain a high contrast ratio. Scattered light can interfere with intended light patterns and reduce overall image integrity.

According to an exemplary embodiment, a second field aperture 116 and a third field aperture 118 can also be provided. By including multiple field apertures, every light beam passing from an external light source into projection system 100 can be sized providing the advantages as describe above in reference to first field aperture 114.

Accordingly, polarizing beam splitter 120 receives red light in a p-polarized state and cyan light in an s-polarized state as inputs through the stops or apertures. According to an exemplary embodiment, polarizing beam splitter 120 can include a pair of right angle prisms to obtain two precise orthogonal output beams of opposite polarization. One of the prism faces can be coated with a dielectric coating to reflect the s-polarized cyan light while passing the p-polarized red light. When used in reverse, polarizing beam splitter 120 can be used to combine two linearly polarized beams into one output. According to an exemplary embodiment, polarizing beam splitter 120 can measure just 10×10×10 millimeters (mm).

Accordingly, the s-polarized cyan light can be reflected in an orthogonal direction from polarizing beam splitter 120 to dichroic prism unit 130. According to an exemplary embodiment, dichroic prism unit 130 can include two glass prisms mated together along a slanted face including a dichroic coating to create a gradient dichroic mirror 135. Dichroic coatings can be used to split incident energy into different beams, each beam having a different spectral content or color. Further, the dichroic coating can be deposited and layered such that there is minimal absorption loss. According to an exemplary embodiment, the energy within the s-polarized cyan light beam is separated according to spectral content into a blue light beam and a green light beam. According to the embodiment shown in FIG. 1, dichroic prism unit 130 includes a green gradient dichroic mirror 135 such that an s-poalrized green light beam is reflected at a 90 degree angle to green LCOS valve 160 while an s-poalrized blue light beam passes straight through to blue LCOS valve 150.

Blue LCOS valve 150 receives an s-polarized blue light beam from dichroic prism unit 130. According to an exemplary embodiment, blue LCOS valve 150 may be but is not limited to a reflective liquid crystal display. Accordingly, blue LCOS valve 150 modulates the polarized state of incident light according to the control voltage applied thereto. Thereafter, blue LCOS valve 150 reflects the modulated light 180 degrees.

According to an exemplary embodiment, blue LCOS valve 150 can reflect and change the polarized state of the incident light through phase retardation when a control voltage is applied across the cell to align the twisted nematic cells therein. After the s-polarized blue light beam is modulated and reflected from blue LCOS valve 150, the blue light beam reenters dichroic prism unit 130.

According to yet another exemplary embodiment, blue LCOS valve 150 can have a spectrum of modes of operation ranging from a fully charged state to an uncharged state. Blue LCOS valve 150 can apply a variable charge within the spectrum to vary the intensity of the blue color in the projection image. When less than a full charge is applied to blue LCOS valve 150, less than the full amount of light will be transmitted through the system 100. Applying less than a full charge enables control over the intensity of any transmitted light. Controlling the intensity of the transmitted light allows greater flexibility in the spectrum of colors that can be display using color micro liquid crystal display projection system 100.

Green LCOS valve 160 receives an s-polarized green light beam from dichroic prism unit 130 through a green trim filter 162. Green trim filter 162 is a cut-off dichroic filter. Green Trim filter 162 functions as a band pass filter to prevent any non-green light from going through green LCOS valve 160.

According to an exemplary embodiment, green LCOS valve 160 can be a reflective liquid crystal display that functions similar to blue LCOS valve 150. Green LCOS valve 160 allows for reflection and intensity control over the incident s-polarized green light beam. The green light beam is modulated and reflected from green LCOS valve 160 to dichroic prism unit 130.

According to an exemplary embodiment, the blue light beam reflected from blue LCOS valve 150 and the green light beam reflected from green LCOS valve 160 recombine within dichroic prism unit 130 to present a single cyan light beam. The cyan light beam then propagates from dichroic prism unit 130 back to polarizing beam splitter 120 through field aperture 116.

Cubic glass 140 receives a p-polarized red light beam from polarizing beam splitter 120 through field aperture 118. Field aperture 118 functions as described above with reference to field aperture 114. Cubic glass 140 is a solid block manufactured using the same type of glass as the dichroic prism unit 130. Cubic glass 140 is used as a buffer to create uniformity in the distances traveled by each of the light beams. This allows for optimized recombination of the light beam for projection. After the cubic glass 140, the p-polarized red light beam propagates to a half wave retarder 175.

According to an exemplary embodiment, half-wave retarder 175 can be but is not limited to a waveplate that alters the polarization of light in a manner that depends on the retardance and the angle between the retarder fast axis and the input plane of polarization. Half-wave retarder 175 flips the polarization direction of incoming light about the retarder fast axis. According to the exemplary embodiment, the angle between the retarder fast axis and the input plane of polarization is 45 degrees and horizontal polarized light is converted to vertical. Half-wave retarder 175 rotates a linear polarized input by twice the angle between the retarder fast axis and the input plane of polarization. Accordingly, the p-polarized red light beam is converted into a s-polarized red light beam and propagated to red LCOS valve 170.

Red LCOS valve 170 receives an s-polarized red light beam from half wave retarder 175. Red LCOS valve 170 can be but is not limited to a micro reflective liquid crystal display that functions similar to blue LCOS valve 150 and green LCOS valve 160. Red LCOS valve 170 allows for reflection and intensity control over the incident s-polarized red light beam. The red light beam is modulated and reflected from red LCOS valve 170 to half wave retarder 175.

Half wave retarder 175 receives a modulated red light beam back from red LCOS valve 170. Half-wave retarder 175 converts the polarizing state of the red light beam and propagates the light beam back through cubic glass 140 and field aperture 118 to polarizing beam splitter 120.

In polarizing beam splitter 120, the s-polarized portion of the reflected polarized red light beam is reflected but the p-polarized portion of the reflecting polarized red light beam is transmitted back to light source 110. Further in polarizing beam splitter 120, the p-polarized portion of the reflected polarized cyan light beam is transmitted but the s-polarized portion of the reflected polarized cyan light beam is reflected back to light source 110. The reflected s-polarized red light beam is combined with the reflected p-polarized cyan light beam. The resultant beam is propagated from polarizing beam splitter 120 to a second Red/Cyan filter pair 177.

Red and cyan filter 177 passes the cyan p-polarized light beams and converts the s-polarized red light beam into a p-polarized light beam. Accordingly, red and cyan filter 177 transfers a linear p-polarized light beam to projection lens 180 for projection on a screen. Regarding light reflected from LCOS valves to polarizing surface of the polarizing beam splitter 120, a linear polarization occurs in an ideal state. According to alternative embodiments, other polarization types, such as a circular polarization or an elliptical polarization can be provided.

Advantageously, color liquid crystal display projection system 100, shown and described with reference to FIG. 1, is a light engine for a micro-LCD projector that is relatively small in size. The smaller size is possible because of compact configuration and reduced optical components. Additionally, the use of field apertures to filter light beam entering the polarizing beam splitter will function to improve image quality.

Figure 2:
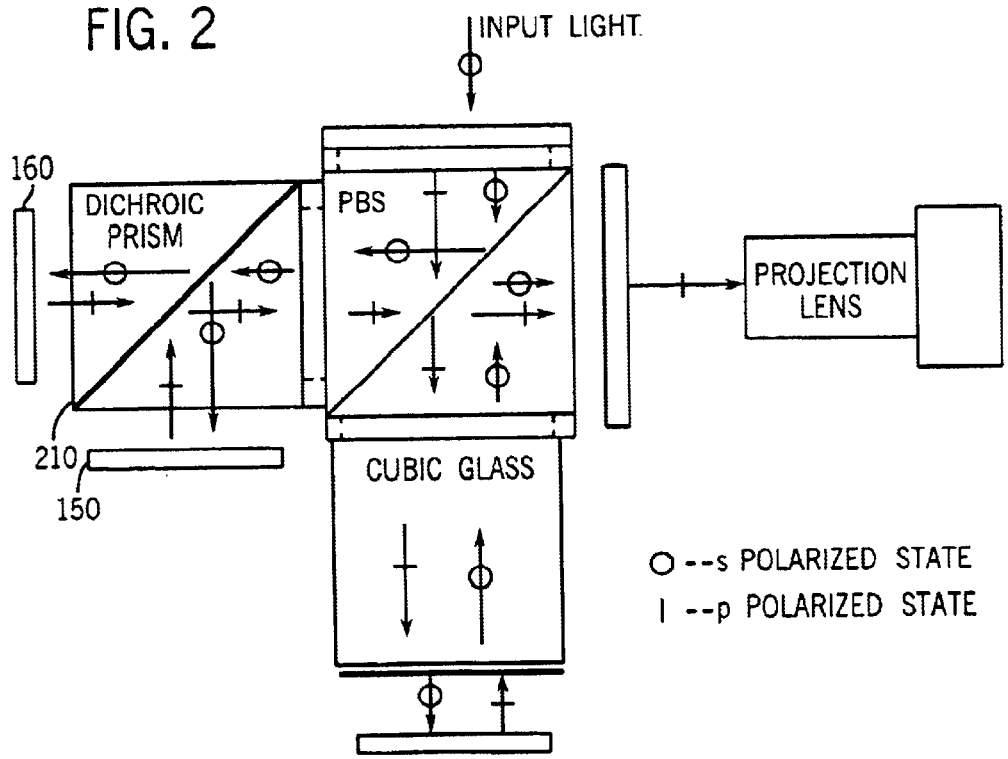
FIG. 2 is an alternative exemplary schematic diagram of a color micro liquid crystal display projection system.

FIG. 2 shows an alternative embodiment of a color micro-LCD projection system 200. Color micro liquid crystal display projection system 200 is similar in construction and operation to color micro liquid crystal display projection system 100 with the exception that green gradient dichroic mirror 135 has been replaced with a blue gradient dichroic mirror 210. The specific arrangement of the LCOS valves is not required to practice the disclosed invention.

According to an the exemplary embodiment shown in FIG. 2, green trim filter 162 has been removed. The green trim filter is not used because the dichroic mirror has good transmission cut off, such that the green color will be easily purified.

Figure 3:
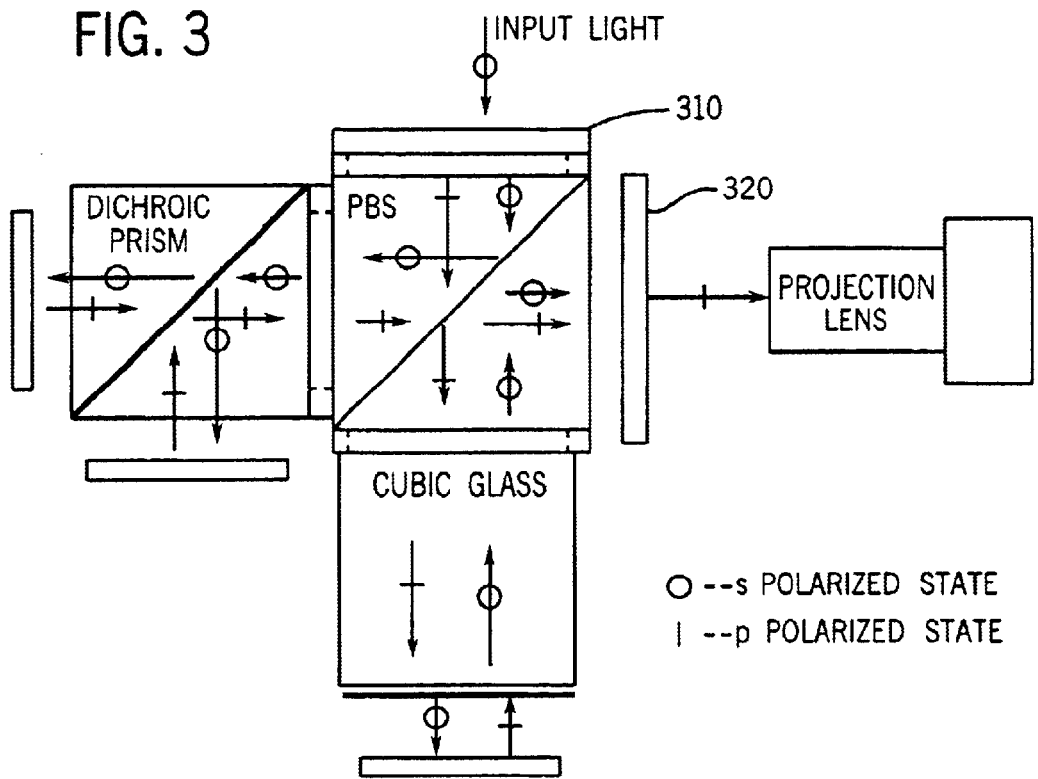
FIG. 3 is yet another exemplary schematic diagram of a color micro liquid crystal display projection system.

According to yet another alternative embodiment, shown in FIG. 3, red and cyan filter pairs 112 and 177 can be replaced by magenta and green filter pairs 310 and 320. This embodiment allows green light to pass through the polarizing beam splitter while blue and red light are reflected. The LCOS valves and dichroic mirror can then be reconfigured according to the alternative embodiment. The efficiencies in image quality and reduced size are not dependent on specific light pathways or place of LCOS valves.

While the exemplary embodiments illustrated in the FIGURES and described above are presently preferred, it should be understood that these embodiments are offered by way of example only. For example, alternative embodiments may be suitable for use, wherein more advanced optical components can be arranged in a similar configuration. Accordingly, the present invention is not limited to a particular embodiment, but extends to various modifications that nevertheless fall within the scope of the appended claims.

What is claimed is:

1. A micro liquid crystal display projector comprising a light source emitting a light beam, a light engine, and a projection lens, the light engine comprising:

a polarizing beam splitter for receiving the light beam from the light source, wherein the polarizing beam splitter orthogonally reflects a light beam containing multiple colors and passes a first light beam containing a single color;

a first optical element positioned between the light source and the polarizing beam splitter, the first optical element reversing the polarization of red light passing therethrough and maintaining the polarization of cyan light passing therethrough;

a dichroic prism that receives the light beam containing multiple colors, reflects a second light beam containing a single color, and passes a third light beam containing a single color; and reflective liquid crystal displays associated with each of the first, second, and third light beams containing a single color for receiving, modulating, and reflecting modulated first, second, and third light beams containing a single color for recombination and projection through the projection lens.

2. The liquid crystal display projector of claim 1, wherein the dichroic prism includes a slanted face that is coated to reflect green light directed thereupon.

3. The liquid crystal display projector of claim 2, further including a green trim filter positioned immediately in front of the reflective liquid crystal display associated with the second light beam containing a single color, wherein the single color is green.

4. The liquid crystal display projector of claim 1, further including a field aperture positioned adjacent to the polarizing beam splitter.

5. The liquid crystal display projector of claim 4, wherein a field aperture is positioned adjacent to the polarizing beam splitter at every light beam entry point to the polarizing beam splitter.

6. A micro liquid crystal display projector comprising a light source emitting an s-polarized multi-colored light beam, a light engine, and a projection lens, the light engine comprising:

a first optical element that receives the s-polarized multi-colored light beam and outputs an s-polarized light beam containing two colors distilled from the multi-colored light beam and a p-polarized light beam containing a single color;

a polarizing beam splitter to reflect the s-polarized light beam containing two colors distilled from the multi-colored light beam and to pass the single colored p-polarized light beam;

a dichroic prism unit for receiving the s-polarized light beam containing two colors distilled from the multi-colored light beam, the dichroic prism unit including a coated surface positioned at a 45 degree angle to the s-polarized light beam containing two colors to separate the s-polarized light beam containing two colors into first and second s-polarized light beams containing a single color;

a cubic glass for receiving and passing the single p-polarized light beam containing a single color;

a half wave retarder for receiving the single p-polarized light beam from the cubic glass and converting the single p-polarized light beam into a third s-polarized light beam containing a single color;

first, second and third reflective liquid crystal displays associated with each s-polarized light beam containing a single color for receiving the s-polarized light beam containing a single color, modulating the light beam and reflecting first, second, and third reflected modulated light beams containing a single color respectively for transmission back to the polarizing beam splitter for polarizing, selection, and recombination, wherein the third reflected modulated light beam containing a signal color passes through the half wave retarder to become a second modulated light beam; and a second optical element for receiving a recombined light beam from the polarizing beam splitter containing first and second reflected modulated light beams containing a single color and the second modulated light beam, wherein the second optical element converts the second modulated light beam into a p-polarized state to create a single polarized light beam that is provided as output to the projection lens;

wherein at least one of the first and second optical elements is configured to reverse the polarization of red light passing therethrough and maintain the polarization of cyan light passing therethrough.

7. The liquid crystal display projector of claim 6, wherein the gradient dichroic mirror is a slanted face that is coated to reflect blue light directed thereupon.

8. The liquid crystal display projector of claim 7, further including a green trim filter positioned immediately in front of the reflective liquid crystal display associated with a light beam containing a single color, wherein the single color is green.

9. The liquid crystal display projector of claim 6, further including a field aperture positioned adjacent to the polarizing beam splitter.

10. The liquid crystal display projector of claim 9, wherein a field aperture is positioned adjacent to the polarizing beam splitter at every light beam entry point to the polarizing beam splitter.

11. A method for projecting an LCD image on a remote screen through a projection lens, comprising:

providing a light beam emitted from a light source;

passing the light beam through a polarizing beam splitter to produce a first light beam containing a single color and a light beam containing multiple colors;

providing a field aperture positioned adjacent to the polarizing beam splitter at every light beam entry point to the polarizing beam splitter;

passing the light beam containing multiple colors through a dichroic prism to produce second and third light beams containing a single color;

passing the first, second, and third light beams containing a single color to associated first, second, and third reflective liquid crystal displays for modulation and reflection; and recombining the modulated first, second, and third light beams for projection though the projection lens.

12. The method of claim 11, further including providing a first optical element positioned between the light source and the polarizing beam splitter to reverse the polarization of a light beam containing a single color and pass a light beam containing multiple colors.

13. The method of claim 12, wherein the first optical element is configured to reverse the polarization of red light passing therethrough and maintain the polarization of cyan light passing therethrough.

14. The method of claim 13, wherein the dichroic prism includes a slanted face that is coated to reflect green light directed thereupon.

15. The method of claim 14, further including a green trim filter positioned immediately in front of the reflective liquid crystal display associated with the second light beam containing a single color, wherein the single color is green.

* * * * *